(12) United States Patent
Liu (10) Patent No.: US 10,121,625 B2
(45) Date of Patent: Nov. 6, 2018

(54) 3-WAY DISCONNECTOR AND EARTH SWITCH FOR GAS INSULATED SWITCHGEAR

(71) Applicant: LSIS CO., LTD., Anyang-si, Gyeonggi-do (KR)

(72) Inventor: Ruiqiang Liu, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/462,724

(22) Filed: Mar. 17, 2017

(65) Prior Publication Data

US 2018/0197709 A1 Jul. 12, 2018

(30) Foreign Application Priority Data

Jan. 6, 2017 (KR) ........................ 10-2017-0002525

(51) Int. Cl.
 *H01H 71/10* (2006.01)
 *H01H 9/00* (2006.01)
 (Continued)

(52) U.S. Cl.
 CPC .............. *H01H 71/10* (2013.01); *H01H 3/04* (2013.01); *H01H 3/44* (2013.01); *H01H 3/46* (2013.01); *H01H 9/0072* (2013.01); *H01H 31/003* (2013.01); *H01H 31/32* (2013.01); *H01H 33/122* (2013.01); *H01H 33/42* (2013.01); *H01H 1/38* (2013.01); *H01H 33/64* (2013.01); *H02B 13/075* (2013.01)

(58) Field of Classification Search
 CPC .. H01H 3/04; H01H 3/44; H01H 3/46; H01H 33/122; H01H 33/42; H01H 31/32; H01H 31/003

USPC ..... 361/604, 612, 618, 621; 218/154, 17, 14
See application file for complete search history.

(56) References Cited

U.S. PATENT DOCUMENTS

2013/0248341 A1 9/2013 Harada et al.
2014/0360853 A1* 12/2014 Sato ..................... H01H 33/666
 200/5 R

FOREIGN PATENT DOCUMENTS

CN 201084615 Y 7/2008
CN 104377071 2/2015
(Continued)

OTHER PUBLICATIONS

European Search Report for related European Application No. 17158388.3; report dated Oct. 5, 2017; (9 pages).

*Primary Examiner* — Zachary Pape
(74) *Attorney, Agent, or Firm* — K&L Gates LLP (57) ABSTRACT

The 3-way disconnector and an earth switch for a gas insulated switchgear includes: a movable portion including a disconnector movable portion and an earth switch movable portion; a disconnector mover and an earth switch mover installed in the disconnector movable portion and the earth switch movable portion so as to be linearly movable; a driving lever rotatably installed between the disconnector mover and the earth switch mover; and a first lever and a second lever rotated by receiving a rotational force of the driving lever, and configured to move the disconnector mover and the earth switch mover, respectively, wherein a driver is protruded at one side of the driving lever, and a driving pin is provided at an end of the driver, and wherein the driving pin is configured to selectively move one of the first and second levers.

8 Claims, 7 Drawing Sheets

(51) Int. Cl.
    *H01H 1/38*    (2006.01)
    *H02B 13/075*    (2006.01)
    *H01H 31/32*    (2006.01)
    *H01H 33/42*    (2006.01)
    *H01H 31/00*    (2006.01)
    *H01H 3/04*    (2006.01)
    *H01H 3/44*    (2006.01)
    *H01H 3/46*    (2006.01)
    *H01H 33/12*    (2006.01)
    *H01H 33/64*    (2006.01)

(56) References Cited

FOREIGN PATENT DOCUMENTS

| | | | | |
|---|---|---|---|---|
| CN | 205303240 | | 6/2016 | |
| EP | 2178099 | A1 | 4/2010 | |
| EP | 3109881 | A1 | 12/2016 | |
| JP | 06295643 | A * | 10/1994 | |
| JP | 2012022942 | A | 2/2012 | |
| JP | 5471925 | | 4/2014 | |
| KR | 20050098360 | | 10/2005 | |
| KR | 100771673 | | 10/2007 | |
| KR | 101212783 | | 12/2012 | |
| KR | 2015-0000647 | * | 2/2015 | ............ H01H 33/42 |
| WO | WO 2017141060 | A1 * | 8/2017 | ........... H01H 31/003 |

* cited by examiner

Fig. 1

Prior Art

Fig. 2

Prior Art

3-WAY DISCONNECTOR AND EARTH SWITCH FOR GAS INSULATED SWITCHGEAR

CROSS-REFERENCE TO RELATED APPLICATION

Pursuant to 35 U.S.C. § 119(a), this application claims the benefit of earlier filing date and right of priority to Korean Application No. 10-2017-0002525, filed on Jan. 6, 2017, the contents of which are all hereby incorporated by reference herein in its entirety.

BACKGROUND OF THE INVENTION

1. Field of the Invention

This specification relates to a 3-way disconnector and earth switch for a gas insulated switchgear, and more particularly, to a 3-way disconnector and earth switch for a gas insulated switchgear capable of preventing a loss of energy under a structure that the disconnector and the earth switch are not interworked with each other even if they are moved by the same driving lever.

2. Background of the Invention

Generally, a gas insulated switchgear is installed on a circuit between a power source side and a load side of an electric system, and serves as an electric device for protecting a power system and a load device by opening or closing a circuit on purpose in a normal current state, or by interrupting an abnormal current such as a ground connection or a short circuit which has occurred on a circuit.

Such a gas insulated switchgear (GIS) generally includes a bushing unit configured to receive electricity from a high voltage power source, a gas circuit breaker (CB), a disconnector, an earth switch, a movable portion, a controller, etc.

The earth switch is installed at both ends of a circuit breaker, and serves to ground a main circuit manually during maintenance and repair and serves to remove a current that remains on a conductor during maintenance and repair. And the disconnector is a device for isolating a circuit or changing a connection after removing a load current during maintenance and repair.

Such a disconnector and an earth switch may be separately driven, but may be connected to and disconnected from the same driving lever in some cases. Here, a method of driving the disconnector and the earth switch by the same driving lever is referred to as a 3-way method.

Figure 1:
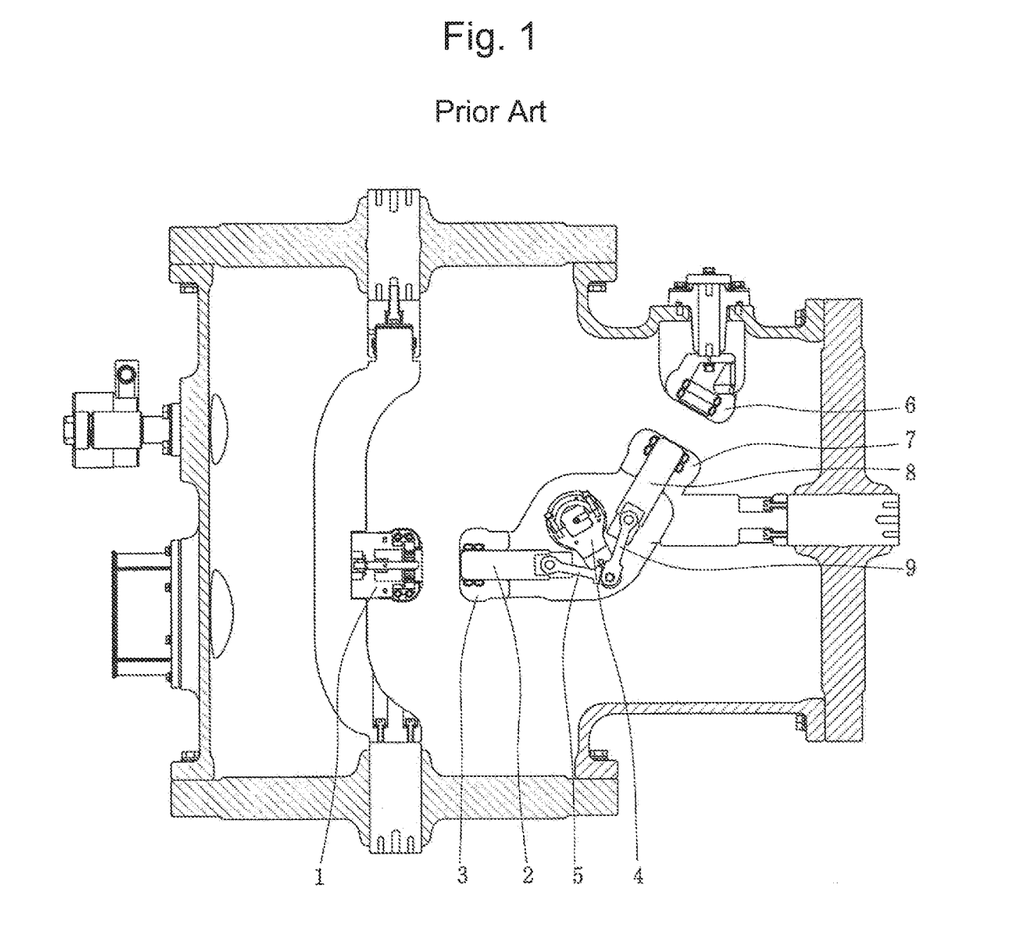
FIG. 1 is a longitudinal sectional view of a 3-way disconnector and earth switch for a gas insulated switchgear in accordance with the conventional art.
Figure 2:
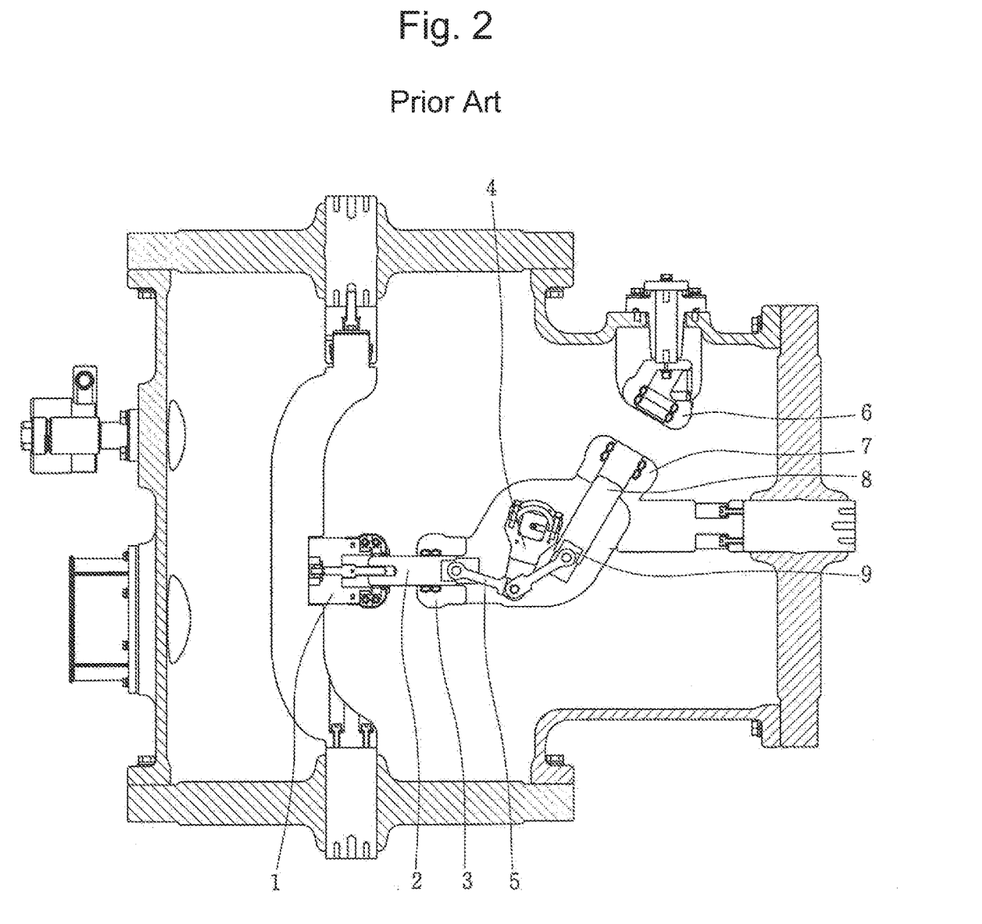
FIG. 2 is a view illustrating an 'on' state of the disconnector of FIG. 1.

FIGS. 1 and 2 show a 3-way disconnector and earth switch for a gas insulated switchgear according to the prior art. FIG. 1 shows a neutral state (an 'off' state of a disconnector and an earth switch), and FIG. 2 shows an 'on' state of the disconnector.

The disconnector includes a disconnector fixing portion 1, a disconnector movable portion 3, a disconnector mover 2, a driving lever 4 and a disconnector link 5.

The earth switch includes an earth switch fixing portion 6, an earth switch movable portion 7, an earth switch mover 8, a driving lever 4, and an earth switch link 9.

The disconnector mover 2 and the earth switch mover 8 are connected to the driving lever 4 through the disconnector link 5 and the earth switch link respectively, and move as the driving lever 4 rotates.

When the driving lever 4 rotates in a clockwise direction in a neutral state, the disconnector mover 2 is linearly moved through the disconnector link 5 to be inserted into the disconnector fixing portion 1. As a result, the disconnector is in an 'on' state. A circuit is in a connected state, as the disconnector movable portion 3 and the disconnector fixing portion 1 are electrically connected to each other through the disconnector mover 2 inserted into the disconnector fixing portion 1.

When the driving lever 4 is rotated in a counterclockwise direction in an 'on' state of the disconnector, the disconnector mover 2 moves in an opposite direction to the 'on' operation to be separated from the disconnector fixing portion 1. As a result, the connected state is disconnected and the circuit is interrupted.

Conversely, when the driving lever 4 is rotated in a counterclockwise direction in a neutral state, the earth switch mover 8 is linearly moved through the earth switch link 9 and is inserted into the earth switch fixing portion 6. As a result, the earth switch is in an 'on' state. The circuit is in a grounded state, as the earth switch movable portion 7 and the earth switch fixing portion 6 are electrically connected to each other through the earth switch mover 8 inserted into the earth switch fixing portion 6.

When the driving lever 4 is rotated in a clockwise direction in an 'on' state of the earth switch, the earth switch mover 8 moves in an opposite direction to the above-described operation and is separated from the earth switch fixing portion 6. As a result, the grounded state is disconnected, and the circuit is isolated from the earth.

Since the disconnector mover 2 and the earth switch mover 8 are moved in a connected state to the same driving lever 4, the earth switch mover 8 is pulled in a reverse direction to an earth switch 'on' direction, and the disconnector mover 2 is pulled in a reverse direction to a disconnector 'on' direction.

That is, in the 3-way disconnector and the earth switch for a gas insulated switchgear according to the prior art, the disconnector mover 2 and the earth switch mover 8 are connected to the same driving lever 4 through the disconnector link 5 and the earth switch link 9, respectively. Accordingly, when the disconnector mover 2 is moved, the earth switch mover 8 is also moved by interworking. This may cause an unnecessary loss of energy. Further, when the earth switch mover 8 is operated, the disconnector mover 2 is also moved by interworking. This may cause an unnecessary loss of energy.

SUMMARY OF THE INVENTION

Therefore, an aspect of the detailed description is to provide a 3-way disconnector and earth switch for a gas insulated switchgear capable of preventing a loss of energy under a structure that the disconnector and the earth switch are not interworked with each other even if they are moved by the same driving lever.

To achieve these and other advantages and in accordance with the purpose of this specification, as embodied and broadly described herein, there is provided a 3-way disconnector and earth switch for a gas insulated switchgear, including: a movable portion including a disconnector movable portion and an earth switch movable portion; a disconnector mover and an earth switch mover installed in the disconnector movable portion and the earth switch movable portion so as to be linearly movable; a driving lever rotatably installed between the disconnector mover and the earth switch mover; and a first lever and a second lever rotated by receiving a rotational force of the driving lever, and configured to move the disconnector mover and the earth switch mover, respectively, wherein a driver is protruded at one side of the driving lever, and a driving pin is provided at an end of the driver, and wherein the driving pin is configured to selectively move one of the first and second levers.

The disconnector mover may be provided with a first cut-out groove at a rear end thereof, and a first pin may be provided to cross the first cut-out groove. And the earth switch mover may be provided with a second cut-out groove at a rear end thereof, and a second pin may be provided to cross the second cut-out groove.

A first sliding hole to which the first pin is slidably coupled may be formed at a part of the first lever, and a second sliding hole to which the second pin is slidably coupled may be formed at the second lever.

A first sliding groove for inserting the driving pin may be formed at the first lever, and a second sliding groove for inserting the driving pin may be formed at the second lever. When the driving pin is inserted into the first sliding groove, the disconnector mover may be moved. And when the driving pin is inserted into the second sliding groove, the earth switch mover may be moved.

The first and second levers may be provided with upper fingers and lower fingers formed at upper and lower parts of the first and second sliding grooves.

The upper finger of the first lever and the upper finger of the second lever may be installed to cross each other.

The first and second levers may be formed to have the same shape, and may be installed to be symmetrical with each other.

Each of the upper fingers may have a cut-out portion at one side thereof.

The driving pin may commonly contact the first and second sliding grooves at a neutral position.

According to the 3-way disconnector and the earth switch for a gas insulated switchgear according to one embodiment of the present invention, a loss of energy may be prevented because the disconnector and the earth switch are not interworked with each other even if they are moved by the same driving lever. As a result, operation stability may be improved, durability and service life may be enhanced, and maintenance costs may be reduced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 6 and 7 are operation views of a 3-way disconnector and earth switch for a gas insulated switchgear according to an embodiment of the present invention, in which FIG. 6 shows an 'on' state of a disconnector and FIG. 7 shows an 'on' state of an earth switch.

DETAILED DESCRIPTION OF THE INVENTION

Description will now be given in detail of preferred configurations of the present invention, with reference to the accompanying drawings.

Figure 3:
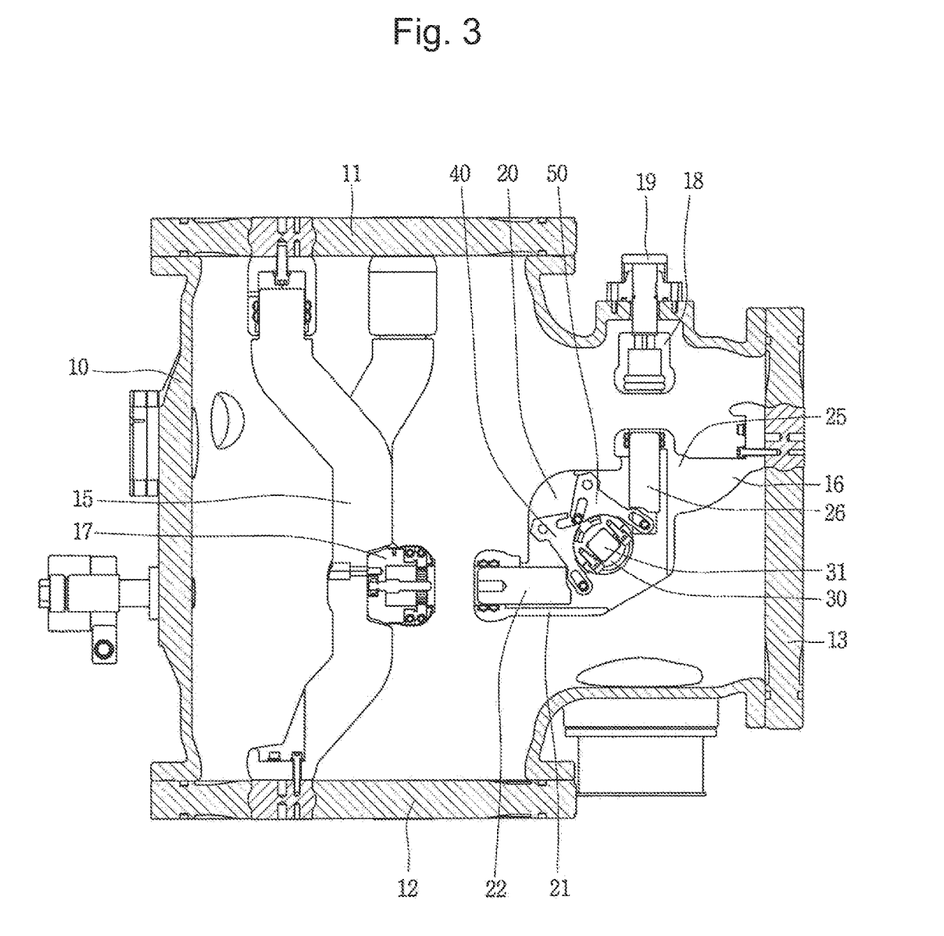
FIG. 3 is a longitudinal sectional view of a 3-way disconnector and earth switch for a gas insulated switchgear according to an embodiment of the present invention.
Figure 4:
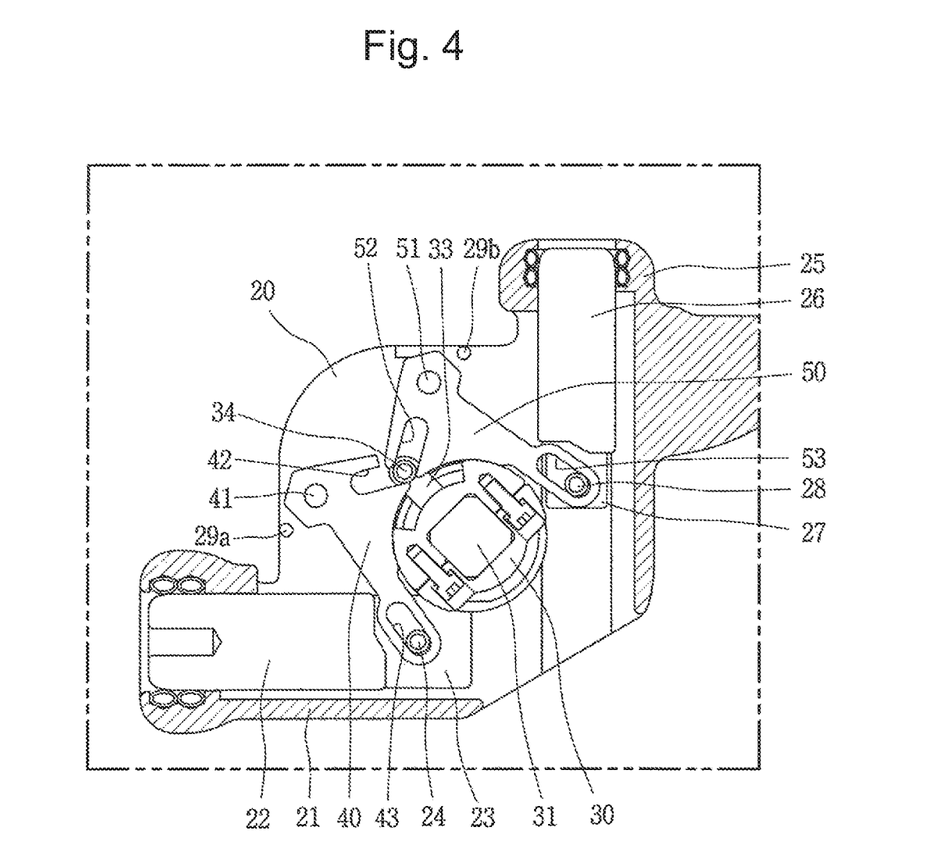
FIG. 4 is a detailed view of a movable portion of FIG. 3.
Figure 5:
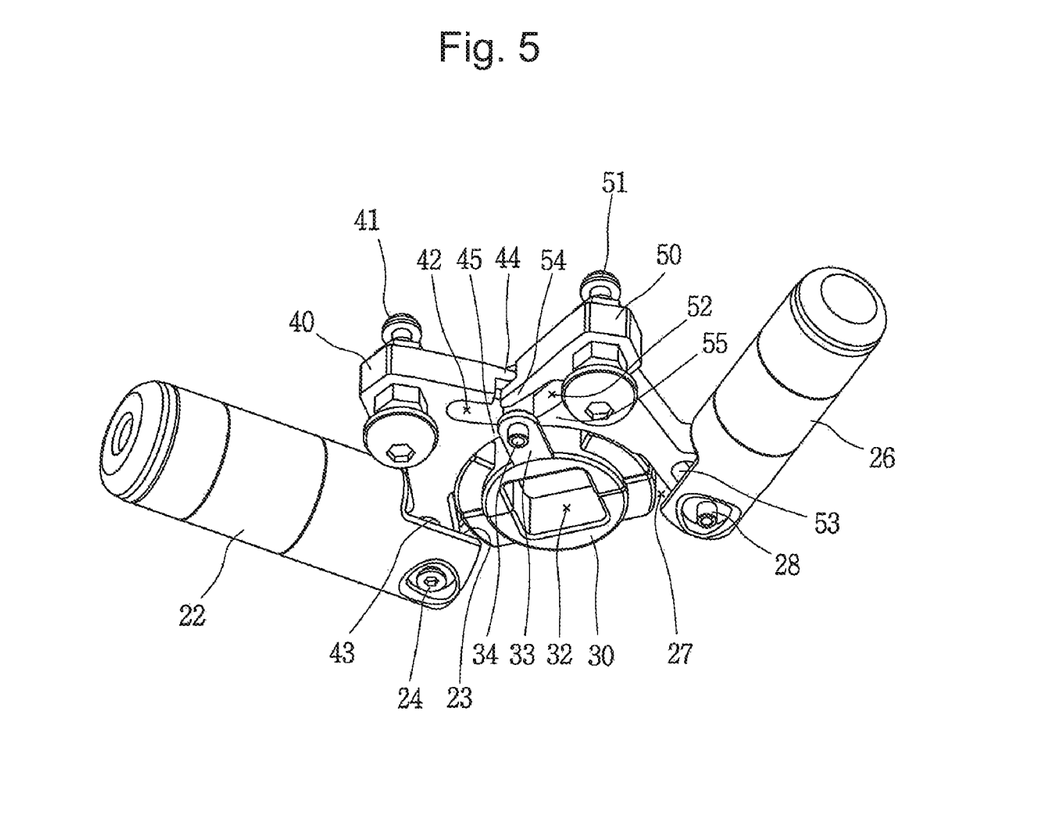
FIG. 5 is a perspective view of the movable portion of FIG. 3, which shows a removed state of a movable portion conductor.

FIG. 3 is a longitudinal sectional view of a 3-way disconnector and earth switch for a gas insulated switchgear according to an embodiment of the present invention. FIG. 4 is a detailed view of a movable portion of FIG. 3. And FIG. 5 is a perspective view of the movable portion of FIG. 3, which shows a removed state of a movable portion conductor.

Hereinafter, a 3-way disconnector and earth switch for a gas insulated switchgear according to each embodiment of the present invention will be explained in more detail with reference to the attached drawings.

A 3-way disconnector and earth switch for a gas insulated switchgear according to an embodiment of the present invention includes: a movable portion 20 including a disconnector movable portion 21 and an earth switch movable portion 25; a disconnector mover 22 and an earth switch mover 26 installed in the disconnector movable portion 21 and the earth switch movable portion 25 so as to be linearly movable; a driving lever 30 rotatably installed between the disconnector mover 22 and the earth switch mover 26; a first lever 40 rotated by receiving a rotational force of the driving lever 30, and configured to move the disconnector mover 22; and a second lever 50 rotatably installed at a second conductor 16, rotated by receiving a rotational force of the driving lever 30, and configured to move the earth switch mover 26. A driver 33 is protruded at one side of the driving lever 30, and a driving pin 34 is provided at an end of the driver 33. The driving pin 34 is configured to selectively move one of the first and second levers 40, 50.

An enclosure 10 (tank) may be formed in a box shape, and may accommodate therein the disconnector and the earth switch. The enclosure 10 may be formed in a pipe shape which is open in at least one of upper, lower, left, right, front, and rear directions. The enclosure 10 may be part of an entire enclosure which constitutes a gas insulated switchgear.

Spacers 11, 12, 13 are coupled to the open part of the enclosure 10. The spacers 11, 12, 13 define a boundary of the enclosure 10 and support conductors.

A plurality of conductors 15, 16 are provided inside the enclosure 10. The conductors 15, 16 are coupled to the respective spacers 11, 12, 13. The conductors 15, 16 may include a first conductor 15 coupled to the first spacer 11 and the second spacer 12, and a second conductor 16 coupled to the third spacer 13. In case of a 3-phase circuit, the conductors 15, 16 may be provided in three pairs.

A disconnector fixing portion 17 is coupled to the first conductor 15. The disconnector fixing portion 17 is fixedly coupled to a part of the first conductor 15. The disconnector fixing portion 17 is formed as a conductor.

An earth switch fixing portion 18 is provided at a part of the enclosure 10. An end of the earth switch fixing portion 18 is connected to a ground wire 19.

The movable portion 20 is provided at a part of the second conductor 16. The disconnector movable portion 21 and the earth switch movable portion 25 may be formed at the movable portion 20. The movable portion 20 may be formed as a conductor assembly or a conductor housing that accommodates the disconnector movable portion 21 and the earth switch movable portion 25 therein.

Each of the disconnector movable portion 21 and the earth switch movable portion 25 is formed in a pipe shape, and the disconnector mover 22 and the earth switch mover 26 may be installed in the disconnector movable portion 21 and the earth switch movable portion 25, so as to be linearly movable. The disconnector mover 22 and the earth switch mover 26 may be installed to have a predetermined angle therebetween (for example, 90° or 120°).

The disconnector mover 22 is provided with a first cut-out groove 23 at a rear end thereof, and a first pin 24 is provided to cross the first cut-out groove 23.

The earth switch mover 26 is provided with a second cut-out groove 27 at a rear end thereof, and a second pin 28 is provided to cross the second cut-out groove 27.

The driving lever 30 is rotatably mounted to the movable portion 20. The driving lever 30 is provided between the disconnector mover 22 and the earth switch mover 26. The driving lever 30 is rotated by a driving shaft 31. The driving lever 30 may be formed in a disc shape. A shaft hole 32 through which the driving shaft 31 is installed is formed at the center of the driving lever 30. A pair of drivers 33 are formed to protrude from one side of the driving lever 30. A driving pin 34 is provided at an end of the pair of drivers 33. Here, it is preferable that the driving shaft 31 is located on a bisector between the disconnector mover 22 and the earth switch mover 26. In a neutral state (DS/ES Off state), the driving shaft 31 and the driving pin 34 are located on the bisector.

The first lever 40 is provided to transmit a force of the driving lever 30 to the disconnector mover 22. The first lever 40 is installed between the disconnector mover 22 and the driving lever 30. The first lever 40 is rotatably installed to the movable portion 20. The first lever 40 may be installed to the movable portion 20 so as to be rotatable by a first lever shaft 41. The first lever 40 may be formed as a triangular plate. The first lever shaft 41 is coupled to a first corner of the first lever 40. A first sliding groove 42 for inserting the driving pin 34 is formed at a second corner of the first lever 40. A first sliding hole 43 to which the disconnector mover 22 is connectable is formed at a third corner of the first lever 40. The first pin 24 is inserted into the first sliding hole 43.

A first upper finger 44 which forms an upper part of the first sliding groove 42, and a first lower finger 45 which forms a lower part of the first sliding groove 42 are provided at the second corner of the first lever 40. Here, the first upper finger 44 has a cut-out portion at one side thereof.

The second lever 50 may be formed in the same manner as the first lever 40. Therefore, detailed descriptions of the second lever 50 will be omitted. Reference numerals of detailed components of the second lever 50 will be used in accordance with those of detailed components of the first lever 40. For example, reference numeral 51 is provided to a second lever shaft of the second lever 50.

The first lever 40 and the second lever 50 may be installed symmetrically with each other. In a neutral state, the first upper finger 44 of the first lever 40 and a second upper finger 54 of the second lever 50 may be installed to cross each other. That is, in an off state of the disconnector and an off state of the earth switch, the driving lever 30 is located at an intermediate position between the disconnector mover 22 and the earth switch mover 26. Here, the first upper finger 44 of the first lever 40 and the second upper finger 54 of the second lever 50 may be installed to cross each other. For example, one side of each of the first upper finger 44 and the second upper finger 54 is cut to form a cut-out portion. Since the first upper finger 44 and the second upper finger 54 are installed symmetrically, they cross each other without interfering with each other.

Stoppers 29a, 29b are provided at a part of the movable portion 20. Each of the stoppers 29a and 29b may stop a rotation of the first lever 40 or the second lever 50.

Figure 6:
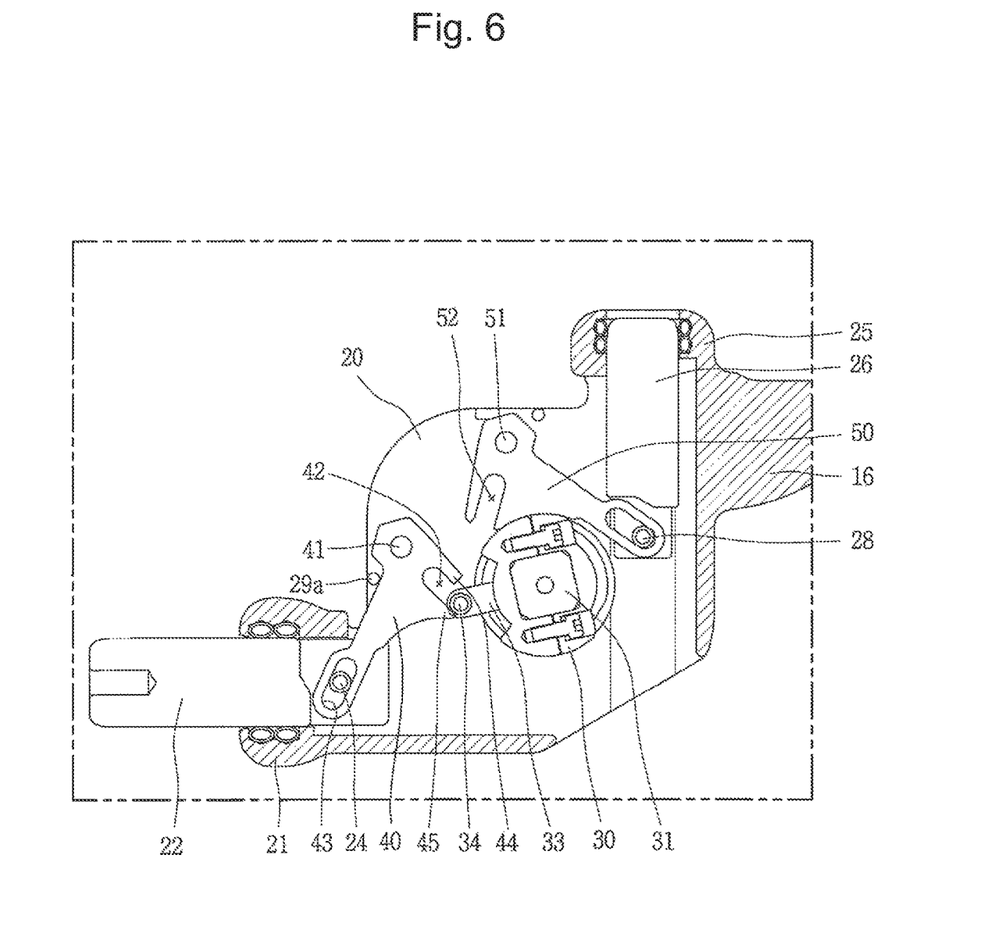
Figure 7:
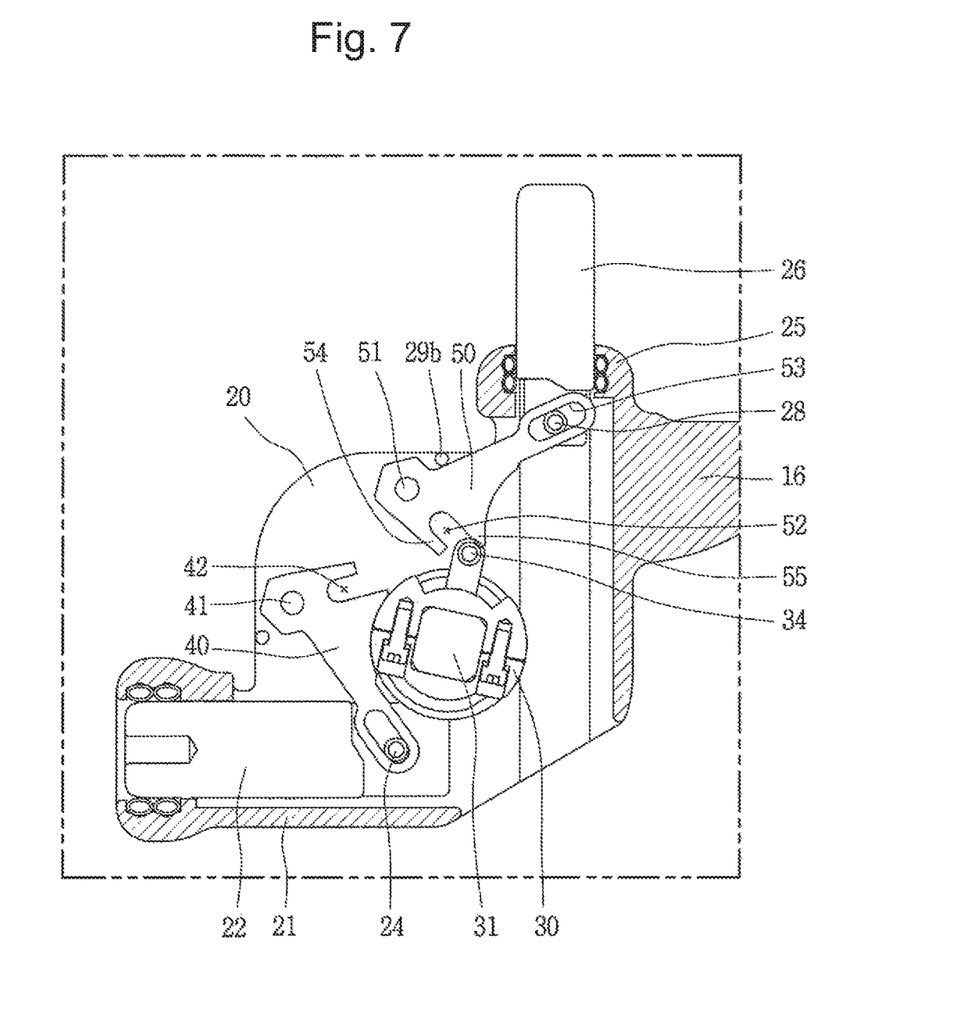

Hereinafter, an operation of the 3-way disconnector and the earth switch for a gas insulated switchgear according to an embodiment of the present invention will be described with reference to FIGS. 4, 6 and 7.

The driving pin 34 of the driving lever 30 is commonly engaged with the first sliding groove 42 of the first lever 40 and a second sliding groove 52 of the second lever 50 at a neutral position (refer to FIG. 4).

First, a case where the disconnector is turned on will be explained. Referring to FIGS. 4 and 6, if the driving lever 30 is rotated in a counterclockwise direction by rotating the driving shaft 31 in a counterclockwise direction at the neutral position (FIG. 4), the driving pin 34 of the driver 33 rotates the first lever 40 in a clockwise direction on the basis of the first lever shaft 41 by pushing the first lower finger 45. As the first lever 40 is rotated, the first pin 24 coupled to the first sliding hole 43 is moved to forward move the disconnector mover 22. As the first lever 40 is rotated, the first pin 24 slides within the first sliding hole 43 and moves horizontally. Here, among forces applied to the first pin 24 by the first lever 40, a force applied in a direction perpendicular to the disconnector mover 22 is converted into a sliding motion, and only a force applied in a direction parallel to the disconnector mover 22 is applied to the first pin 24. As the disconnector mover 22 is coupled to the disconnector fixing portion 17, the 'on' operation is completed (refer to FIG. 6). An excessive over stroke of the first lever 40 in the 'on' state is prevented by the first stopper 29a.

When the disconnector is turned off, an operation is performed in a reversed manner to the aforementioned manner. If the driving lever 30 is rotated in a clockwise direction by rotating the driving shaft 31 in a clockwise direction in an 'on' state of the disconnector (FIG. 6), the driving pin 34 of the driver 33 rotates the first lever 40 in a counterclockwise direction on the basis of the first lever shaft 41 by pushing the first upper finger 44. As the first lever 40 is rotated, the first pin 24 coupled to the first sliding hole 43 is moved to backward move the disconnector mover 22. The disconnector mover 22 is separated from the disconnector fixing portion 17, and stops moving when the driving lever 30 reaches the neutral position (FIG. 4).

When the disconnector is turned on or off, the first lever 40 and the disconnector mover 22 move, but the second lever 50 and the earth switch mover 26 do not move in a fixed state.

Next, a case where the earth switch is turned on will be explained. Referring to FIGS. 4 and 7, if the driving lever 30 is rotated in a clockwise direction by rotating the driving shaft 31 in a clockwise direction at the neutral position (FIG. 4), the driving pin 34 of the driver 33 rotates the second lever 50 in a counterclockwise direction on the basis of the second lever shaft 51 by pushing a second lower finger 55. As the second lever 50 is rotated, the second pin 28 coupled to a second sliding hole 53 is also moved to forward move the earth switch mover 26. Here, among forces applied to the second pin 28 by the second lever 50, a force applied in a direction perpendicular to the earth switch mover 26 is converted into a sliding motion, and only a force applied in a direction parallel to the earth switch mover 26 is applied to the second pin 28. As the earth switch mover 22 is coupled to the earth switch fixing portion 18, the 'on' operation is completed (refer to FIG. 7). An excessive over stroke of the second lever 50 in the 'on' state is prevented by the second stopper 29b.

When the earth switch is turned off, an operation is performed in a reversed manner to the aforementioned manner. If the driving lever 30 is rotated in a counterclockwise direction by rotating the driving shaft 31 in a counterclockwise direction in an 'on' state of the earth switch (FIG. 7), the driving pin 34 of the driver 33 rotates the second lever 50 in a clockwise direction on the basis of the second lever shaft 51 by pushing the second upper finger 54. As the second lever 50 is rotated, the second pin 28 coupled to the second sliding hole 53 is moved to backward move the earth switch mover 22. The earth switch mover 22 is separated from the earth switch fixing portion 18, and stops moving when the driving lever 30 reaches the neutral position (FIG. 4).

When the earth switch is turned on or off, the second lever 50 and the earth switch mover 22 move, but the first lever 40 and the disconnector mover 22 do not move in a fixed state.

According to the 3-way disconnector and the earth switch for a gas insulated switchgear according to one embodiment of the present invention, a loss of energy is prevented because the disconnector and the earth switch are not interworked with each other even if they are moved by the same driving lever. As a result, operation stability is improved, durability and service life are enhanced, and maintenance costs are reduced.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A three-way disconnector and an earth switch for a gas insulated switchgear, comprising:
a movable portion including a disconnector movable portion and an earth switch movable portion;
a disconnector mover and an earth switch mover installed in the disconnector movable portion and the earth switch movable portion so as to be linearly movable;
a driving lever rotatably installed between the disconnector mover and the earth switch mover; and
a first lever and a second lever rotated by receiving a rotational force of the driving lever, and configured to move the disconnector mover and the earth switch mover, respectively,
wherein a driver is protruded at one side of the driving lever, and a driving pin is provided at an end of the driver,
wherein the driving pin is configured to selectively move one of the first and second levers,
wherein the disconnector mover is provided with a first cut-out groove at a rear end thereof, and a first pin is provided to cross the first cut-out groove, and
wherein the earth switch mover is provided with a second cut-out groove at a rear end thereof, and a second pin is provided to cross the second cut-out groove.

2. The three-way disconnector and the earth switch for the gas insulated switchgear of claim 1, wherein a first sliding hole to which the first pin is slidably coupled is formed at a part of the first lever, and a second sliding hole to which the second pin is slidably coupled is formed at the second lever.

3. The three-way disconnector and the earth switch for the gas insulated switchgear of claim 1, wherein a first sliding groove for inserting the driving pin is formed at the first lever, and a second sliding groove for inserting the driving pin is formed at the second lever,
wherein when the driving pin is inserted into the first sliding groove, the disconnector mover is moved, and
wherein when the driving pin is inserted into the second sliding groove, the earth switch mover is moved.

4. The three-way disconnector and the earth switch for the gas insulated switchgear of claim 3, wherein the first and second levers are provided with upper fingers and lower fingers formed at upper and lower parts of the first and second sliding grooves.

5. The three-way disconnector and the earth switch for the gas insulated switchgear of claim 4, wherein the upper finger of the first lever and the upper finger of the second lever are installed to cross each other.

6. The three-way disconnector and the earth switch for the gas insulated switchgear of claim 4, wherein each of the upper fingers has a cut-out portion at one side thereof.

7. The three-way disconnector and the earth switch for the gas insulated switchgear of claim 1, wherein the first and second levers are formed to have the same shape, and are installed to be symmetrical with each other.

8. The three-way disconnector and the earth switch for the gas insulated switchgear of claim 3, wherein the driving pin commonly contacts the first and second sliding grooves at a neutral position.

* * * * *